United States Patent
Mino (10) Patent No.: US 7,978,058 B2
(45) Date of Patent: Jul. 12, 2011

(54) DIGITAL RADIO BROADCAST RECEIVER, RADIO BROADCAST RECEIVING UNIT AND DIGITAL RADIO BROADCAST RECEIVING SYSTEM

(75) Inventor: Osamu Mino, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 527 days.

(21) Appl. No.: 12/230,403

(22) Filed: Aug. 28, 2008

(65) Prior Publication Data

US 2009/0058623 A1  Mar. 5, 2009

(30) Foreign Application Priority Data

Aug. 28, 2007  (JP) .................. 2007-221887

(51) Int. Cl.
*B60Q 1/00* (2006.01)
*G09F 9/00* (2006.01)
(52) U.S. Cl. .............. 340/461; 340/438; 340/425.5; 340/459; 340/460
(58) Field of Classification Search .......... 340/438, 340/425.5, 459, 460, 461
See application file for complete search history.

(56) References Cited

U.S. PATENT DOCUMENTS

| 5,303,399 A | * | 4/1994 | Kobayashi ............ 340/7.55 |
| 6,088,577 A | * | 7/2000 | Yang et al. ............ 340/7.57 |
| 2005/0151871 A1 | | 7/2005 | Minami |

FOREIGN PATENT DOCUMENTS

| JP | A-8-84086 | 3/1996 |
| JP | A-8-297680 | 11/1996 |
| JP | A-2001-16553 | 1/2001 |
| JP | A-2002-135732 | 5/2002 |
| JP | A-2002-217761 | 8/2002 |
| JP | A-2002-247575 | 8/2002 |
| JP | A-2005-191708 | 7/2005 |

* cited by examiner

*Primary Examiner* — Travis R Hunnings
(74) *Attorney, Agent, or Firm* — Oliff & Berridge PLC (57) ABSTRACT

A digital radio broadcast receiver, a radio broadcast receiving unit and a digital radio broadcast receiving system are provided. Character information stored in a memory is displayed as image on a display device when such a condition that a vehicle speed is 0 km/h and a foot brake or a hand brake is on is satisfied, i.e., when a vehicle is halted or parked. Or, the character information stored in the memory is outputted as voice through a voice output device when such a condition that the vehicle speed is 0 km/h and the foot brake or the hand brake is on is not satisfied, i.e., when the vehicle is traveling.

5 Claims, 4 Drawing Sheets

DIGITAL RADIO BROADCAST RECEIVER, RADIO BROADCAST RECEIVING UNIT AND DIGITAL RADIO BROADCAST RECEIVING SYSTEM

BACKGROUND OF THE INVENTION

1. Field of the Invention

The present invention relates to a digital radio broadcast receiver, a radio broadcast receiving unit and a digital radio broadcast receiving system, capable of receiving radio broadcast signals which are transmitted from a broadcasting station and include voice information and character information.

2. Description of the Related Art

A character multiplex broadcast has been placed in practice in the TV broadcast, and a digital radio broadcast via a broadcast satellite has been carried out in the field of the radio broadcast, too. Besides, a ground wave digital radio broadcast has been launched and a testing broadcast has already been put into practice. These digital radio broadcasts are capable of transmitting voice information such as music and the like maintaining high quality as well as transmitting additional program information such as character information and image files related to the programs being multiplexed on voice information.

The additional program information is, for example, information for identifying a program, information related to contents of a program and additional information therefor. The information for identifying a program is information related to, for example, a service ID (identification information), name of a broadcasting station, name of the program and category of the program. The information related to contents of a program is information related to a genre of music of the tune on air, name of the tune and names of players in the case of a music program. In the case of, for example, a music program, the additional information is text data of a long sentence describing a lyric of the tune on air in the program and matters related to a concert played by the players in the program. Upon receipt of a program of the digital radio broadcast, the digital radio broadcast receiver displays the additional program information on a display unit thereof.

According to a data broadcast display device disclosed in Japanese Unexamined Patent Publication JP-A 2001-16553, the broadcasted character information is temporarily stored in a character data storage unit, a character string in the character data storage unit is compared with a predetermined form character string stored in a character pattern memory, a form character string included in the character data is identified, and the form character string is converted into display conversion data through a data converting unit and are displayed on an image display unit.

According to an electronic apparatus disclosed in Japanese Unexamined Patent Publication JP-A 2005-191708, a character string of a keyword is set in advance and when the character string of the keyword is included in the received broadcast data, the received broadcast data is displayed on a sub-display. When the character string of the keyword has not been included, the received broadcast data is displayed on a main display.

According to an FM multiplex broadcast receiver disclosed in Japanese Unexamined Patent Publication JP-A 8-84086 (1996), when character information in the FM multiplex data is displayed on a display unit and characters in part of the displayed character information are specified as a keyword, the character information including the specified characters is extracted out of the FM multiplex data in the subsequently received FM multiplex broadcasted signals and is successively displaced on the display unit.

According to an information collection assisting apparatus disclosed in Japanese Unexamined Patent Publication JP-A 8-297680 (1996), a character signal demodulating device demodulates character multiplex modulated signals including the broadcast characters, and the character encoding device converts the demodulated broadcast characters into an encoded character string. Data in the form of image, voice or document is stored in a database device, and a database retrieving device compares the encoded character string with the data in the database device, outputs position information of a keyword while the characters are on air, and displays the information on a retrieval screen which is different from the data screen.

According to a broadcast data screen split display system disclosed in Japanese Unexamined Patent Publication JP-A 2002-135732, a list of digital broadcast is displayed on a list display screen, and the individual information selected from the list is displayed on an individual information display screen.

According to these related arts, the received character information is simply displayed but after the information is once displayed, the same character information is not displayed again. Therefore, if a user overlooks the displayed character information, the character information that is overlooked can never be watched. To watch the received character information, further, the user must switch the display screen so as to display the received character information forcing the user to carry out cumbersome operation.

When the digital radio broadcast receiver is mounted on a vehicle, further, the digital radio broadcast receiver must be capable of reliably informing the driver of information desired by the driver without hindering the driving operation of the driver.

SUMMARY OF THE INVENTION

An object of the invention is to provide a digital radio broadcast receiver, a radio broadcast receiving unit and a digital radio broadcast receiving system, capable of reliably and easily informing the user of information desired by the user.

A digital radio broadcast receiver of the invention comprises a receiving unit, a determining unit, a storage unit and a control unit. The receiving unit receives digital radio broadcast signals including voice information and character information. The determining unit determines whether or not a character string set by an operator is included in the character information included in the digital radio broadcast signals received by the receiving unit. The storage unit stores the character information when the determining unit determines that the set character string is included in the character information. Depending upon a traveling condition of a vehicle, the control unit controls a display device provided on its exterior so that the character information stored in the storage unit is displayed as image or controls a voice output device provided on its exterior so that the character information stored in the storage unit is outputted as voice.

According to the invention, depending upon the traveling condition of the vehicle, the character information stored in the storage unit is displayed as image on the display device provided on the exterior, or the character information stored in the storage unit is outputted as voice from the voice output device provided on the exterior. Thus, the manner of informing of the character information is changed depending upon the traveling condition of the vehicle preventing hindrance on a driving operation of a user or driver of the vehicle, while reliably and easily informing the driver of character information desired by the driver by using the display device or voice output device provided on the exterior.

The radio broadcast receiving unit of the invention comprises a receiving unit, a display unit, a determining unit, a storage unit and a control unit. The receiving unit receives radio broadcast signals including voice information and character information. The display unit displays, as image, the character information included in the radio broadcast signals received by the receiving unit. The determining unit determines whether or not a character string set by an operator is included in the character information included in the radio broadcast signals received by the receiving unit. When the determining unit determines that the set character string is included in the character information, the storage unit stores the character information. Depending upon a traveling condition of a vehicle, the control unit controls display unit so that the character information stored in the storage unit is displayed as image or controls the voice output device provided on the exterior so that the character information stored in the storage unit is outputted as voice.

According to the invention, depending upon the traveling condition of the vehicle, the character information stored in the storage unit is displayed by the display unit as image, or the character information stored in the storage unit is outputted as voice from the voice output device provided on the exterior. Thus, the manner of informing of the character information is changed depending upon the traveling condition of the vehicle preventing hindrance on a driving operation of a user or driver of the vehicle, while reliably and easily informing the driver of character information desired by the driver by using the display unit or voice output device provided on the exterior.

A digital radio broadcast receiving system of the invention comprises a receiving unit, a voice output unit, a display unit, a determining unit, a storage unit and a control unit. The receiving unit receives digital radio broadcast signals including voice information and character information. The voice output unit outputs, as voice, the voice information and character information included in the digital radio broadcast signals received by the receiving unit. The display unit displays, as image, the character information included in the digital radio broadcast signals received by the receiving unit. The determining unit determines whether or not a character string set by the operator is included in the character information included in the digital radio broadcast signals received by the receiving unit. When the determining unit determines that the character string that is set is included in the character information, the storage unit stores the character information. Depending upon a traveling condition of a vehicle, the control unit controls display unit so that the character information stored in the storage unit is displayed as image or controls voice output unit so that the character information stored in the storage unit is outputted as voice.

According to the invention, depending upon the traveling condition of the vehicle, the character information stored in the storage unit is displayed by the display unit as image, or the character information stored in the storage unit is outputted as voice from the voice output unit. Thus, the manner of informing of the character information is changed depending upon the traveling condition of the vehicle preventing hindrance on the driving operation of the user or the driver of the vehicle, while reliably and easily informing the driver of the character information desired by the driver by using the display unit or the voice output unit.

BRIEF DESCRIPTION OF THE DRAWINGS

Other and further objects, features, and advantages of the invention will be more explicit from the following detailed description taken with reference to the drawings wherein.

DETAILED DESCRIPTION

Now referring to the drawings, preferred embodiments of the invention are described below.

Figure 1:
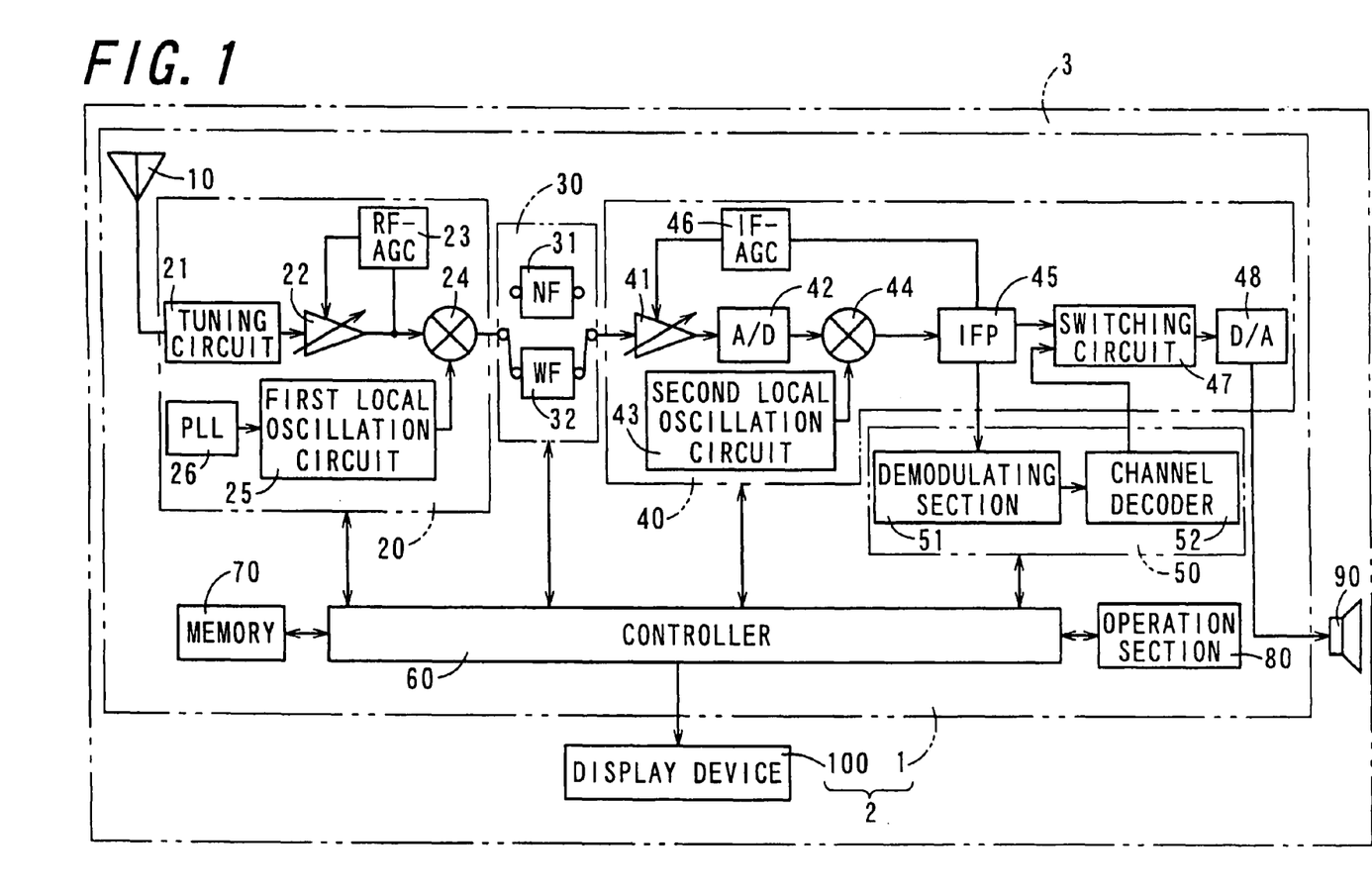
FIG. 1 is a block diagram illustrating the electrical constitution of a digital radio broadcast receiver according to an embodiment of the invention.

FIG. 1 is a block diagram illustrating the electrical constitution of a digital radio broadcast receiving system 3 according to an embodiment of the invention. The digital radio broadcast receiving system (hereinafter occasionally referred to as "receiving system") comprises a digital radio broadcast receiver (hereinafter occasionally referred to as "receiver") 1, a voice output device 90 and a display device 100. A radio broadcast receiving unit 2 comprises the receiver 1 and the display device 100.

The receiver 1 extracts voice information and character information included in the digital radio broadcast signals transmitted from a broadcasting station that has a broadcasting facility, and outputs the extracted voice information through the voice output device 90 provided on the exterior. The receiver 1, further, outputs the extracted character information as voice through the voice output device 90 provided on the exterior or displays the extracted character information as image on the display device 100. The character information is a text information related to, for example, weather, atmospheric temperature, stock prices, traffic congestion, news, sports, entertainment, culture, art and science and technology. The receiver 1 is realized by using, for example, an HD (high definition) radio receiver. The receiver 1 is used, for example, being mounted on a mobile body such as a vehicle.

When the receiver 1 is constituted, for example, integrally with a navigation device having a function of displaying an image such as a map and for guiding the driver to a destination, information such as music, still image or moving image can be reproduced and displayed, the information being recorded in a recording medium such as a compact disk (abbreviated as CD) or a digital versatile disk (abbreviated as DVD). The CD/DVD reproducing device may be integral with the receiver 1 or the receiver 1 may be used by itself, and the invention can be applied to either case.

The receiver 1 includes an antenna 10, a pre-processing unit 20, an intermediate-frequency (abbreviated as IF) filtering circuit 30, a digital signal processing unit 40, an IBOC (In-Band On-Channel) processing unit 50, a controller 60, a memory 70 and an operation unit 80.

The pre-processing unit 20 includes a tuning circuit 21, an RF (radio-frequency) amplifier circuit 22, an RF-AGC (automatic gain control) circuit 23, a first mixing circuit 24, a first local oscillation circuit 25 and a PLL (phase-locked loop) station selection circuit 26, and is controlled by the controller 60. The tuning circuit 21 is realized by a tuning circuit of the electronic tuning system that receives signals from the antenna 10. The RF amplifier circuit 22 is so constituted that the gain thereof is adjusted by the RF-AGC circuit 23. A signal of an S-level, i.e., a signal representing the state of an electric field from the RF-AGC circuit 23 is used for detecting the digital broadcast carrier waves of the IBOC system that will be described later.

The first local oscillation circuit 25 is of the PLL synthesizer system, and generates a first local oscillation signal through a predetermined frequency step according to a PLL control signal fed from the PLL station selection circuit 26 responsive to a control signal from the controller 60. The received signal of a high frequency amplified through the RF amplifier circuit 22 is mixed with the first local oscillation signal through the first mixing circuit 24 and converted into an intermediate-frequency signal, and the intermediate-frequency signal is inputted to the IF filter circuit 30.

The IF filtering circuit 30 includes a narrowband filter (hereinafter often called "NF") 31 which is a band-pass filter (abbreviated as BPF) having a band width of about 100 kHz and a wideband filter (hereinafter often called "WF") 32 which is a BPF having a band width of about 400 kHz, and is changed over by a control signal from the controller 60. The NF 31 and the WF 32 extract components included in predetermined bands relative to a center frequency of the intermediate-frequency signals that are inputted.

The digital signal processing unit 40 includes an IF amplifier circuit 41, an A/D (analog/digital) converter circuit 42, a second local oscillation circuit 43, a second mixing circuit 44, an IF processor circuit (hereinafter occasionally referred to as "IFP circuit") 45, an IF-AGC circuit 46, a switching circuit 47 and a D/A (digital/analog) converter circuit 48, and is controlled by the controller 60.

The intermediate-frequency signal that has passed through the IF filtering circuit 30 is amplified through the IF amplifier circuit 41, converted from the analog signal into a digital signal through the A/D converter circuit 42, and is mixed with a second local oscillation signal from the second local oscillation circuit 43 through the second mixing circuit 44. The mixed signal is inputted to the IFP circuit 45. The IFP circuit 45 also works as a demodulator for analog broadcast carrier waves. When the signal is an analog broadcast carrier wave, the IFP circuit 45 outputs the decoded voice signal to the switching circuit 47, and outputs a signal of a digital broadcast carrier wave that is inputted to the IBOC processing unit 50. The IF amplifier circuit 41 is so constituted that the gain thereof is adjusted by the IF-AGC circuit 46.

The IBOC processing unit 50 includes a demodulating unit 51 and a channel decoder 52, and is controlled by the controller 60. The demodulating unit 51 has a function of demodulating the orthogonal frequency division multiplexing (abbreviated as OFDM) sub-carrier wave included in the digital broadcast carrier wave. When the demodulated signal is a voice signal, the channel decoder 52 produces a voice signal, which is outputted to the switching circuit 47. When the demodulated signal includes SIS (station information service) information, i.e., includes character information and video information, a dedicated decoder that is not shown produces the character information and the video information, which are stored in the memory 70 that will be described later. In response to a control signal from the controller 60, the video information stored in the memory 70 is displayed at a predetermined timing on the display device 100 that will be described later. Depending upon a control signal from the controller 60, the character information stored in the memory 70 is outputted at a predetermined timing from the voice output device 90 that will be described later, or is displayed at a predetermined timing on the display device 100 that will be described later.

The controller 60 is a processing circuit constituted by, for example, a central processing unit (abbreviated as CPU). The controller 60 controls the switching circuit 47 so as to select either a voice signal decoded from the analog broadcast carrier wave or a voice signal decoded from the digital broadcast carrier wave. The voice signal selected by the switching circuit 47 is converted into an analog signal through the D/A converter circuit 48, and is outputted through the voice output device 90 realized by using, for example, a speaker. The storage unit 70 includes at least one of the RAM (random access memory), ROM (read-only memory) and flash ROM. The memory 70 stores an operation program for operating the receiver 1 and a predetermined arithmetic processing program. The memory 70 stores information (hereinafter occasionally referred to as "setting information") including a predetermined position of display on the display device 100 for displaying character information, display time and the type of the display device 100. The type of the display device 100 refers to the size of the display device 100 which, when used being mounted on the vehicle, can be classified into a 1DIN size measuring 178 mm wide and 50 mm high, and a 2DIN size measuring 178 mm wide and 100 mm high.

The operation unit 80 has a plurality of operation buttons operated by the user for inputting the data, such as the one for tuning, the one for setting the sound volume, etc. When the operation buttons are operated, the operation unit 80 generates signals representing information corresponding to the operations such as numerical figure information, character information and instruction information to the controller 60, and feeds them to the controller 60. Therefore, the user can input information to the controller 60 through the operation of the operation buttons of the operation unit 80.

In this embodiment, the operation unit 80 is operated by the user when it is attempted to initially set a predetermined character string related to desired character information among the character information included in the digital radio broadcast signals received by the antenna 10 and the pre-processing unit 20. The predetermined character string includes, for example, "Temperature" related to atmospheric temperature information and "Weather" related to weather information. The predetermined character string set by operating the operation unit 80 is stored in the memory 70.

The operation unit 80 is operated by the user when it is attempted to change the setting information stored in the memory 70. When the operation unit 80 is operated to change the setting information, the setting information to be stored in the memory 70 is updated.

The operation unit 80 is further operated by the user when it is attempted to set the order of displaying the character information stored in the memory 70 on the display device 100 and to set the order of outputting the character information through the voice output device 90. The memory 70 stores the order of display and the order of output set by operating the operation unit 80.

The display device 100 is realized by using at least one of a transmissive liquid crystal display element, a reflective liquid crystal display element, an electro luminescence (EL)

element and a semi-transmissive and semi-reflective liquid crystal display element. The display device 100 may produce either a color display or a monochrome display.

The antenna 10 and the pre-processing unit 20 of this embodiment correspond to a receiving unit. The digital signal processing unit 40 and the voice output device 90 correspond to a voice output unit. The display device 100 corresponds to a display unit. The operation unit 80 corresponds to a setting unit. The controller 60 corresponds to a determining unit and a control unit. The memory 70 corresponds to a storage unit.

Figure 2:
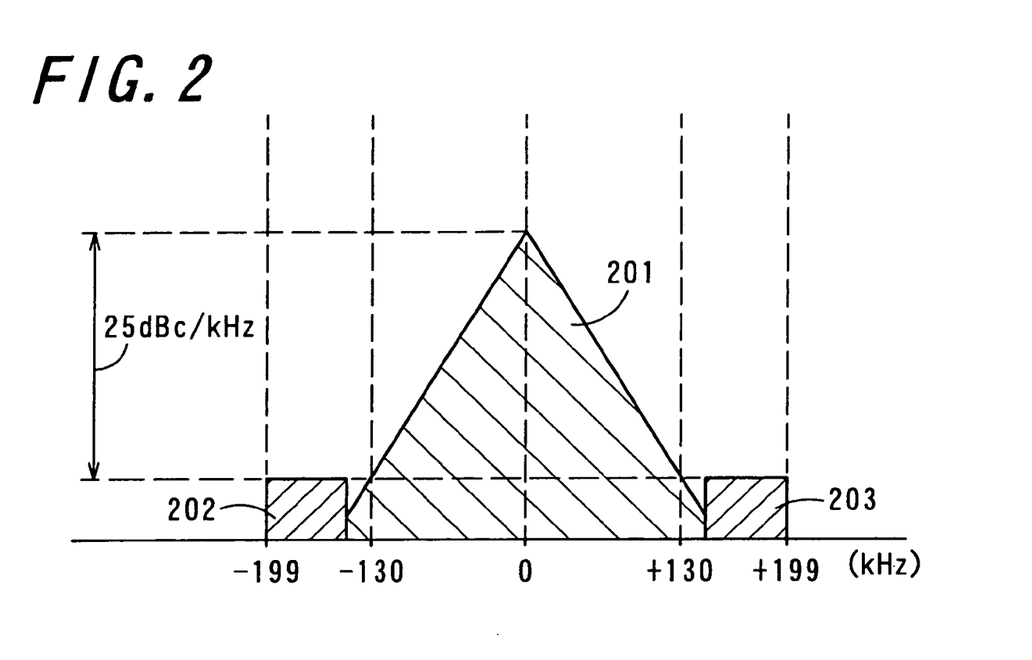
FIG. 2 is a diagram schematically illustrating a form of an analog broadcast carrier wave (FM analog signal) of an IBOC system.
Figure 3:
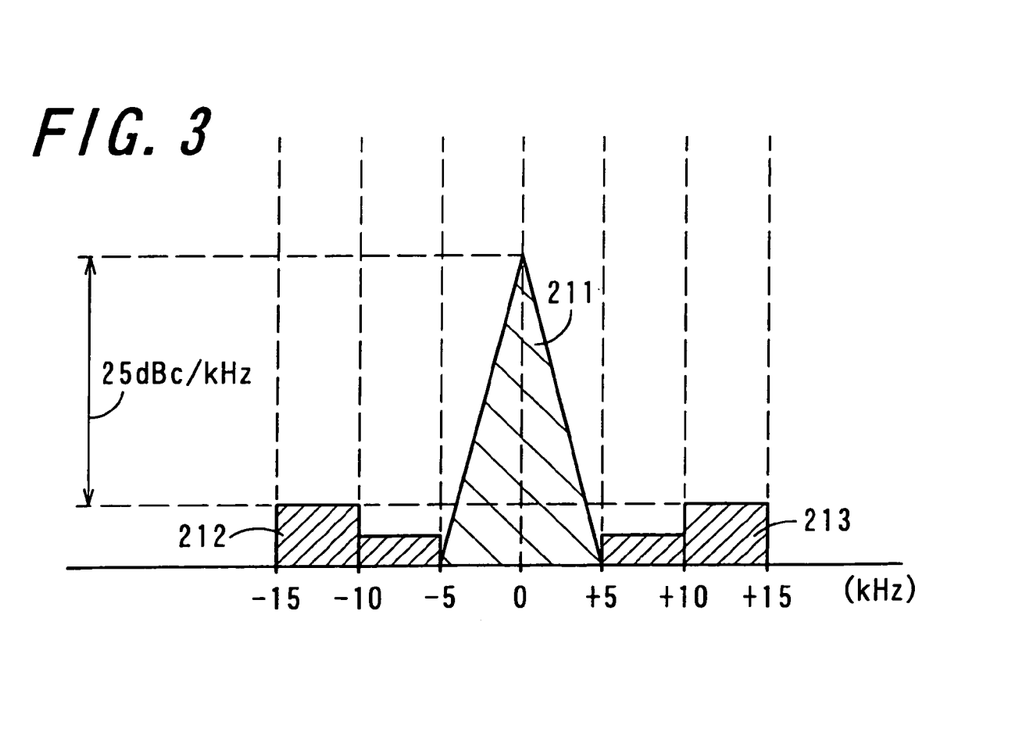
FIG. 3 is a diagram schematically illustrating a form of an analog broadcast carrier wave (AM analog signal) of the IBOC system.

FIG. 2 is a diagram schematically illustrating a mode of an analog broadcast carrier wave (FM analog signal) of an IBOC system, and FIG. 3 is a diagram schematically illustrating a mode of an analog broadcast carrier wave (AM analog signal) of the IBOC system.

Referring to FIG. 2, digital broadcast carrier waves 202 and 203 are arranged neighboring the upper side band and the lower side band on the frequency band of the analog broadcast carrier wave (FM analog signal) 201. The digital broadcast carrier waves 202 and 203 of the upper side band and the lower side band are constituted by a plurality of OFDM-modulated sub-carrier waves and, as shown, occupy spectra separated by 130 kHz to 199 kHz and by −130 kHz to −199 kHz away from the center frequency of the FM analog signals. Further, the digital broadcast carrier waves 202 and 203 of the upper side band and the lower side band have peak values that are set to be −25 dBc/kHz with respect to a peak value of the FM analog signals.

Referring to FIG. 3, digital broadcast carrier waves 212 and 213 are arranged neighboring the upper side band and the lower side band on the frequency band of the analog broadcast carrier wave (AM analog signal) 211. The digital broadcast carrier waves 212 and 213 of the upper side band and the lower side band are constituted by a plurality of OFDM-modulated sub-carrier waves and, as shown, occupy spectra separated by 5 kHz to 15 kHz and by −5 kHz to −15 kHz away from the center frequency of the AM analog signals. Further, the digital broadcast carrier waves 212 and 213 of the upper side band and the lower side band have peak values that are set to be −25 dBc/kHz with respect to a peak value of the AM analog signals.

Figure 4:
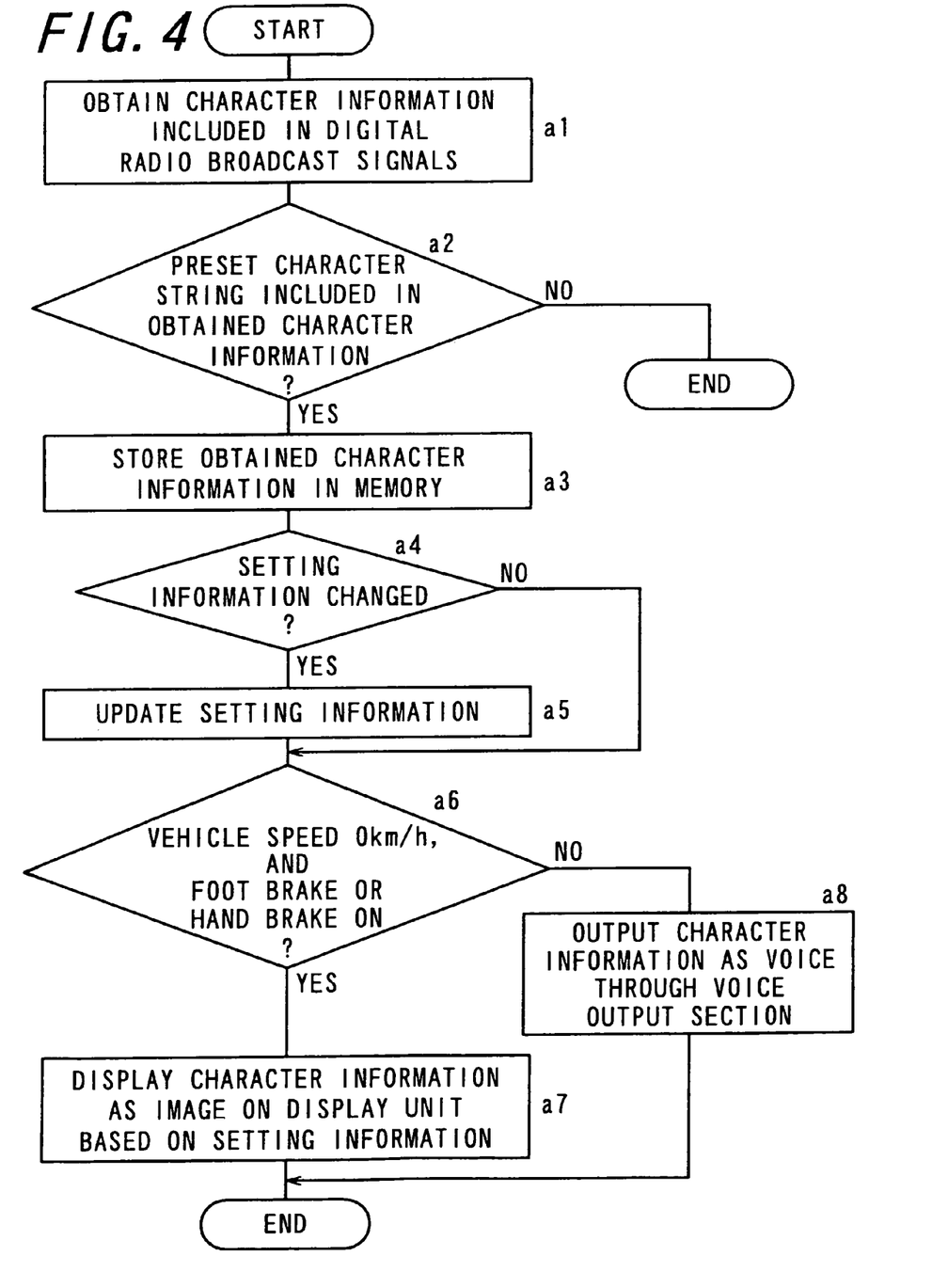
FIG. 4 is a flowchart illustrating a processing procedure of a controller for processing the output of character information.
Figure 5:
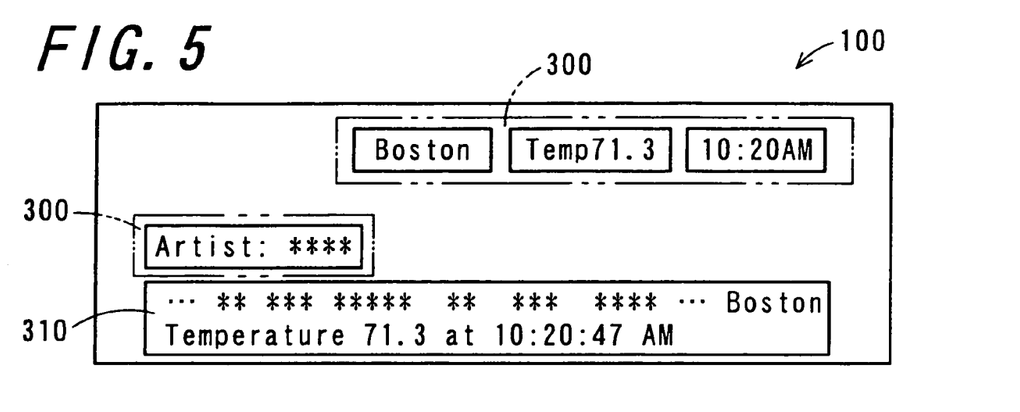
FIG. 5 is a diagram of character information displayed on a display device of a 1DIN size.
Figure 6:
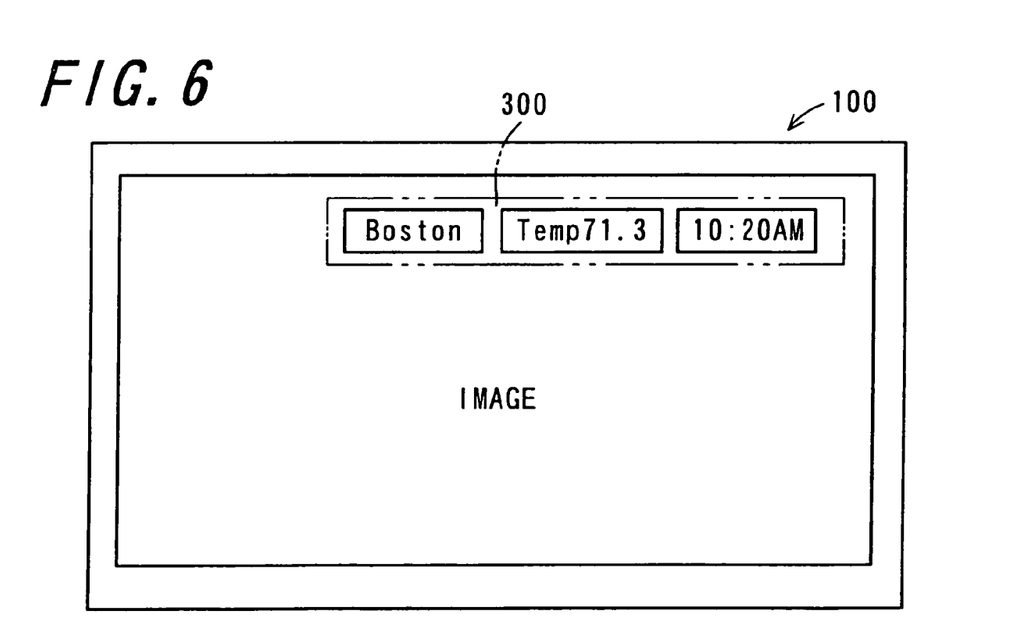
FIG. 6 is a diagram of character information displayed on the display device of a 2DIN size.

FIG. 4 is a flowchart illustrating a procedure of the controller 60 for processing the output of character information. FIG. 5 is a diagram of character information 300 displayed on the display device 100 of the 1DIN size. FIG. 6 is a diagram of character information 300 displayed on the display device 100 of the 2DIN size. In the flowchart of FIG. 4, the processing starts under a condition where the digital radio broadcast signals transmitted from a broadcasting station are received by the receiver 1, and the procedure proceeds to step a1.

At Step a1, character information included in the digital radio broadcast signals received by the antenna 10 and the pre-processing unit 20 is obtained. After the character information is obtained, the procedure proceeds to step a2.

At step a2, it is determined whether or not the preset character string is included, e.g., whether or not the character string "Temp" representing the atmospheric temperature is included in the character information obtained at step a1. When the character string is included therein, the procedure proceeds to step a3. When the character string is not included therein, the procedure of processing all ends. At step a3, the character information obtained at step a1 is stored in the memory 70. After the character information is stored in the memory 70, the procedure proceeds to step a4.

At step a4, it is determined whether or not the setting information is changed by operating the operation unit 80. When it is determined that the setting information has been changed, the procedure proceeds to step a5. When it is determined that the setting information has not been changed, the procedure proceeds to step a6. At step a5, the setting information which has been stored in the memory 70 is updated. After the setting information is updated, the procedure proceeds to step a6.

At step a6, from a plurality of sensors mounted on the vehicle are obtained information representing the traveling speed of the vehicle (hereinafter called "vehicle speed") and information representing the operating state of the foot brake or the hand brake, and it is determined whether or not the vehicle speed is 0 km/h and the foot brake or the hand brake is on. At step a6, when the condition that the vehicle speed is 0 km/h and the foot brake or the hand brake is on is satisfied, it is determined that the vehicle is halted or parked and the procedure proceeds to step a7. When the above condition is not satisfied, it is determined that the vehicle is traveling and the procedure proceeds to step a8. Here, the foot brake that is on stands for a state where the foot brake pedal is depressed while the hand brake that is on stands for a state where the hand brake lever is pulled and the vehicle is held in the halted state.

At step a7, the character information stored in the memory 70 is displayed as image on the display device 100 based on the setting information stored in the memory 70, such as information representing a position for displaying the character information on the display device 100, display time and the type of the display device 100.

In a case where the display device 100 is, for example, of the 1DIN size, the character information 300 is displayed on a display position determined in advance depending upon the type thereof as shown in FIG. 5. As a concrete example of displaying the character information 300, as shown in FIG. 5, the character information 300 indicating "Boston", "Temp 71.3" and "10:20 AM" meaning that the atmospheric temperature in Boston at 10 o'clock past 20 minutes a.m. is 71.3 degrees Fahrenheit, is displayed as image on the right upper end of the display device 100, and the character information 300 indicating "Artist: . . . " which is the name of a player playing the tune on air, is displayed as image on the left central portion of the display device 100. As shown in FIG. 5, further, the display device 100 of the 1DIN size is provided with a scroll display region 310 on the lower end portion of the display device 100, and character information included in the received digital radio broadcast signals is displayed while being scrolled as image on the scroll display region 310.

In a case where the display device 100 is, for example, of the 2DIN size, when video information recorded in a recording medium such as DVD is reproduced and an image representing the video information is displayed on the display device 100 as shown in FIG. 6, the character information 300 of "Boston, "Temp 71.3" and "10:20 AM" is displayed as image on the right upper end portion of the display device 100 that is displaying the image, the character information 300 being displayed in a translucent manner until, for example, a predetermined period of display time elapses.

The image of character information 300 while the video information is being displayed on the display device 100 is not limited to the translucent display only, but may be realized by the so-called pop-up display by which the image of the character information 300 is displayed being superposed on part of the image of the video information. After the passage of the predetermined period of display time from when the image of the character information 300 was translucently displayed or pop-up displayed on the display device 100, the character information 300 displayed as image on the display device 100 is erased from the display device 100 and is no longer displayed.

After the character information 300 is displayed as image on the display device 100 for a predetermined period of display time at step a7, the procedure of processing all ends.

At step a8, the character information stored in the memory 70 is outputted as voice from the voice output device 90. After the character information is outputted as voice from the voice output device 90 at step a8, the procedure of processing all ends.

According to the digital broadcast receiver 1, radio broadcast receiving unit 2 and digital broadcast receiving system 3 of this embodiment as described above, the character information stored in the memory 70 is displayed as image on the display device 100 or the character information stored in the memory 70 is outputted as voice through the voice output device 90 depending upon the traveling condition of the vehicle. Concretely describing as for the traveling condition of the vehicle, when the vehicle is halted or parked, the character information stored in the memory 70 is displayed as image on the display device 100. When, for example, the vehicle has halted at an intersection, halted on the side of the road or has halted on a parking lot, the character information stored in the memory 70 is displayed as image on the display device 100. In this embodiment, when such a condition that the vehicle speed is 0 km/h and the foot bake or the hand brake is on is satisfied, it is determined that the vehicle is halted or parked. As for the traveling condition of the vehicle, further, when the vehicle is traveling, the character information stored in the memory 70 is outputted as voice from the voice output device 90. In this embodiment, when such a condition that the vehicle speed is 0 km/h and the foot brake or the hand brake is on is not satisfied, it is determined that the vehicle is traveling.

Thus, the manner of informing the user of the character information is changed depending upon the traveling condition of the vehicle or, concretely, depending upon whether the vehicle is stopped or driven, preventing hindrance on the driving operation of the user or the driver of the vehicle, while reliably and easily informing the driver of the character information desired by the driver.

According to the digital broadcast receiver 1, radio broadcast receiving unit 2 and digital broadcast receiving system 3 of this embodiment, further, when video information recorded in a recording medium such as DVD is reproduced and the image representing the video information is displayed on the display device 100, the character information is displayed as image on the display device 100 that is displaying the video information, in a translucent manner or as the pop-up display until a predetermined period of display time elapses. Unlike related arts, therefore, the user is allowed to watch the obtained character information without the need of executing cumbersome operation such as switching the display screen for displaying the obtained character information and, therefore, to easily make sure the character information. Therefore, the user finds it more convenient to use the device.

According to the digital broadcast receiver 1, radio broadcast receiving unit 2 and digital broadcast receiving system 3 of this embodiment, further, the character information once stored in the memory 70 is maintained stored in the memory 70 until a new character information is obtained. Therefore, the user can operate the operation unit 80 to have the character information stored in the memory 70 displayed on the display device 100 or outputted through the voice output device 90 as required. Therefore, even when the user has overlooked the character information displayed on the display device 100 or has failed to listen to the character information outputted through the voice output device 90, the character information that was overlooked or could not be listened to can be displayed again on the display device 100 or can be outputted again through the voice output device 90 so as to be made sure unlike related arts. Therefore, the user finds it more convenient to use the device.

According to the digital broadcast receiver 1, radio broadcast receiving unit 2 and digital broadcast receiving system 3 of this embodiment, further, the user can operate the operation unit 80 to set the setting information inclusive of a position for displaying on the display device 100 the character information stored in the memory 70, display time and the size of the display device 100. When the user sets at least one of the display position, display time and the size of the display device 100, the character information stored in the memory 70 is displayed as image on the display device 100 based on the setting information that is set. Therefore, the user is allowed to easily set the position on the display device 100 for displaying the desired character information, display time and the size of the display device 100 as he likes, and finds it more convenient to use.

According to the digital broadcast receiver 1, radio broadcast receiving unit 2 and digital broadcast receiving system 3 of this embodiment, further, the user can operate the operation unit 80 to set the order of displaying, on the display device 100, the character information stored in the memory 70 and the order of outputting the character information through the voice output device 90. When the order of display is set by the user, the character information stored in the memory 70 is displayed as image on the display device 100 based on the order of display that is set. When the user has set the order of output, further, the character information stored in the memory 70 is outputted as voice from the voice output device 90 based on the order of output that is set.

Therefore, the character information desired by the user can be displayed on the display device 100 in order of display set by the user, or can be outputted from the voice output device 90 in order of output set by the user. Therefore, the user finds it more convenient to use the device.

According to the digital broadcast receiver 1, radio broadcast receiving unit 2 and digital broadcast receiving system 3 of this embodiment, further, the character information included in the received broadcast signals is stored in the memory 70 as a predetermined pattern (hereinafter referred to as "form pattern") comprising a plurality of character strings. When the form pattern does not include the predetermined character string set by the user, a predetermined character string corresponding to the character information is added before or after the form pattern, which is stored in the memory 70. The form pattern can be arbitrarily set by the user.

When the character information stored in the memory 70 is to be outputted through the display device 100 or the voice output device 90, the character information is retrieved based on a predetermined character string included in the form pattern and set by the user or based on a predetermined character string corresponding to the character information, and is read out from the memory 70.

When the character information included in the received broadcast signals is, for example, atmospheric temperature information like "Boston Temperature 71.3 at 10:20:47 AM", the form pattern comprises character strings of "district", "Temperature", "temperature", "at" and "time". Three kinds of data, i.e., district, temperature and time are stored in the memory 70 in connection with the character string "Temperature". When the atmospheric temperature information is outputted through the display device 100 or the voice output device 90, the data before and after the character string "Temperature" which is a key is read out or, here, the data of district, temperature and time is read out from memory 70. The form pattern of a case where the character information is atmospheric temperature information is not limited to the one consisting of the character strings of "district", "Temperature", "temperature", "at" and "time", but can be changed by the user.

When the character information included in the received broadcast signals is, for example, weather information like "Detroit Weather Partly Cloudy", the form pattern comprises character strings of "district", "Weather", and "general weather conditions". In the memory 70, two kinds of data, i.e., district and general weather conditions are stored in connection with the character string "Weather". When the weather information is outputted through the display device 100 or the voice output device 90, the data before and after the character string "Weather" which is a key is read out or, here, the data of district and general weather conditions is read out from the memory 70. The form pattern of a case where the character information is weather information is not limited to the one consisting of the character strings of "district", "Weather" and "general weather conditions", but can be changed by the user.

When the character information included in the received broadcast signals is, for example, stock price information like "Nasdaq 2511.11-64.73", the form pattern comprises character strings of "SYMBOL", "LAST" and "CHANGE". In the memory 70, three kinds of data, i.e., name, final value and value of change are stored. In this case, the form pattern does not include the character string set by the user. Therefore, a predetermined character string corresponding to the character information, such as "Trade" or "Finance" is added before or after the form pattern, which is stored in the memory 70. When the stock price information is outputted through the display device 100 or the voice output device 90, the data before and after the character string "Trade" or "Finance" which is a key is read out or, here, the data of name, final value and value of change is read out from the memory 70.

When information representing predetermined weather like "Partly Cloudy" or "Mostly Sunny" is stored as character information in the memory 70, the information representing the predetermined weather is converted into a symbol, which is stored in the memory 70. When the information is different from the information representing the weather included in the broadcast signals received after the passage of a predetermined period of time, an arrow "→" may be inserted between the symbols corresponding to information representing the weather before and after the passage of the predetermined period of time to represent a change in the weather.

According to the digital broadcast receiver 1, radio broadcast receiving unit 2 and digital broadcast receiving system 3 of this embodiment, further, the character information stored in the memory 70 may be displayed on the display device 100 in real time or may be read out and outputted through the voice output device 90 in real time. Further, the character information stored in the memory 70 may be displayed on the display device 100 or outputted through the voice output device 90 based on the operation of the operation unit 80 by the user or the operation by voice recognition. Further, the character information stored in the memory 70 may be so constituted as to be recorded in other recording media.

The above embodiment is only an example of the invention, and the constitution of the invention can be modified within a scope thereof. In the above embodiment, the position of display was described to be a display portion of a car stereo or a navigation unit. However, the position of display may be a head-up display projected to an indicator in an instrument or projected to the windshield.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A digital radio broadcast receiver mounted on a vehicle comprising:
   a receiving unit to receive digital radio broadcast signals including voice information and character information;
   a determining unit to determine whether or not a character string set by an operator is included in the character information included in the digital radio broadcast signals received by the receiving unit;
   a storage unit to store the character information when the determining unit determines that the character string that is set is included in the character information; and
   a control unit to control a display device provided on its exterior so that the character information stored in the storage unit is displayed as image or control a voice output device provided on its exterior so that the character information stored in the storage unit is outputted as voice, depending upon a traveling condition of the vehicle.

2. The digital radio broadcast receiver according to claim 1, further comprising a setting unit capable of setting a position of display, display time and the type of the display unit on the display unit for displaying the character information stored in the storage unit, wherein
   when at least one of the position of display, display time and the type of the display unit is set by the setting unit, the control unit controls the display unit so that the character information is displayed as image based upon the setting by the setting unit.

3. The digital radio broadcast receiver according to claim 2, wherein the setting unit is so constituted as to set the order of displaying, on the display unit, the character information stored in the storage unit and to set the order of outputting the character information through the vice output unit,
   when the order of display is set by the setting unit, the control unit controls the display unit so that the character information stored in the storage unit is displayed as image based on the order of display set by the setting unit, and
   when the order of output is set by the setting unit, the control unit controls the voice output unit so that the character information stored in the storage unit is outputted as voice based on the order of output set by the setting unit.

4. A radio broadcast receiving unit mounted on a vehicle comprising:
   a receiving unit to receive radio broadcast signals including voice information and character information;
   a display unit to display, as image, character information included in the radio broadcast signals received by the receiving unit;
   a determining unit to determine whether or not a character string set by an operator is included in the character information included in the radio broadcast signals received by the receiving unit;

a storage unit to store the character information when the determining unit determines that the character string that is set is included in the character information; and a control unit to control a display unit so that the character information stored in the storage unit is displayed as image or control a voice output device provided on its exterior so that the character information stored in the storage unit is outputted as voice, depending upon a traveling condition of the vehicle.

5. A digital radio broadcast receiving system mounted on a vehicle comprising:

a receiving unit to receive digital radio broadcast signals including voice information and character information;

a voice output unit to output, as voice, voice information and character information included in the digital radio broadcast signals received by the receiving unit;

a display unit to display, as image, character information included in the digital radio broadcast signals received by the receiving unit;

a determining unit to determine whether or not a character string set by an operator is included in the character information included in the digital radio broadcast signals received by the receiving unit;

a storage unit to store the character information when the determining unit determines that the character string that is set is included in the character information; and a control unit to control the display unit so that the character information stored in the storage unit is displayed as image or control the voice output unit so that the character information stored in the storage unit is outputted as voice, depending upon a traveling condition of the vehicle.

* * * * *